United States Patent [19]

Satou et al.

[11] Patent Number: 5,611,592
[45] Date of Patent: Mar. 18, 1997

[54] AUTOMOBILE REAR BODY STRUCTURE

[75] Inventors: Kazuo Satou; Tomoyuki Inoue; Yoshiaki Hino, all of Wako, Japan

[73] Assignee: Honda Giken Kogyo Kabushiki Kaisha, Japan

[21] Appl. No.: 544,760

[22] Filed: Oct. 18, 1995

[30] Foreign Application Priority Data

Oct. 19, 1994 [JP] Japan .................................. 6-253652

[51] Int. Cl.⁶ ............................................... B62D 25/08
[52] U.S. Cl. ............................ 296/203; 296/195; 296/30
[58] Field of Search ................................... 296/187–189, 296/193–195, 29, 30, 203, 204

[56] References Cited

U.S. PATENT DOCUMENTS

| 4,875,733 | 10/1989 | Chado et al. | 296/195 |
| 5,246,263 | 9/1993 | Tanaka et al. | 296/189 |

FOREIGN PATENT DOCUMENTS

| 58-87650 | 6/1983 | Japan . | |
| 169375 | 7/1986 | Japan | 296/195 |
| 219489 | 9/1988 | Japan | 296/195 |

Primary Examiner—Dennis H. Pedder
Attorney, Agent, or Firm—Adams & Wilks

[57] ABSTRACT

A rear body structure of an automobile having a door in its rear portion comprises a side panel forming a side surface of an automobile body and a rear panel connected to the side panel and forming a rear surface, the side panel being comprised of an outer side panel and an inner side panel. On an outer surface of a rear part of the inner side panel, there is provided a reinforcing member extending vertically of the body, to which an auxiliary reinforcing member, extending between the inner and outer side panels rearwardly of the body, is connected. The auxiliary reinforcing member is connected at its rear portion to an inner end of the rear panel by means of the corner member. As a result, improved rigidity is provided at the rear panel and connection between the same and the side panel without providing any other member which projects into the inside of the automobile.

36 Claims, 8 Drawing Sheets

AUTOMOBILE REAR BODY STRUCTURE

BACKGROUND OF THE INVENTION

1. Field of the Invention

The present invention relates to an improvement in a rear frame or body structure of an automobile having a door in a rear portion thereof.

2. Description of the Related Art

Generally, an automobile such as, for example, a hatch-back type automobile having a door in its rear portion, includes a rear body structure comprised of a side panel forming a side surface of the automobile and a rear panel connected to the side panel to form a rear surface of the automobile and having an opening for accommodating a back door movable between opened and closed positions. In such a structure, it has been desired to provide increased rigidity to the rear panel and adjacent portions, particularly to the connections therebetween, to increase the rigidity of the overall automobile body to thereby make the automobile operate more efficiently and provide a comfortable feel to a driver of the automobile.

To provide increased rigidity to the connection between the rear panel and adjacent portions, Japanese Utility Model Laid-Open Publication No. SHO 58-87650, entitled REAR BUMPER OF AN AUTOMOBILE, for example, discloses an arrangement disposed inside of an automobile, which is comprised of a rear end panel 1 connected to a rear frame 4 by means of a reinforcing member 11, as shown in FIG. 1 of the publication. However, the prior art arrangement has a drawback in that the reinforcing member 11 projects into the inside of the automobile, thus reducing the interior space of the automobile.

Such drawback may be overcome by arranging a rear cross member at a rear part of the automobile body to extend transversely of the automobile and a rear panel connected at its lower part to the rear cross member to thereby produce increased rigidity at the connections between the rear panel and adjacent portions. In this instance, however, since it is required to keep an automobile floor flat to provide a room at the rear part of the automobile for keeping baggages, etc., the automobile body needs to be lengthened by a distance required for disposing the rear cross member, thus resulting in an increased weight of the automobile body.

It is therefore an object of the present invention to provide a rear body structure of an automobile, which is adapted to produce increased rigidity at its connection between a rear panel and adjacent portions without reducing the interior space of the automobile and making the automobile heavy.

SUMMARY OF THE INVENTION

To achieve the foregoing object, there is provided, according to one aspect of the present invention, a rear body structure of an automobile having an opening in its rear surface, which comprises a side panel forming a side surface of a rear body of the automobile; a rear panel connected to the side panel and forming the rear surface of the automobile, the side panel being comprised of an outermost (exterior) outer side panel and an inner side panel located inwardly of the outer side panel; a reinforcing member disposed on an outer surface of a rear portion of the inner side panel and extending vertically of the body; an auxiliary reinforcing member disposed on the reinforcing member and extending between the outer and inner side panels rearwardly of the body; and a corner member connecting a rear portion of the auxiliary reinforcing member to an inner end of the rear panel.

Since the inner end of the rear panel is connected to the side panel by means of the corner member and auxiliary reinforcing member, the connection between the rear panel and side panel has increased rigidity.

The auxiliary reinforcing member extends between the outer and inner side panels, and the corner member is connected to the rear portion of the auxiliary reinforcing member and inner end of the rear panel. Thus, none of the members, disposed to produce increased rigidity at the connection between the rear and side panels, projects into the inside of the automobile, whereby a large space is provided inside the automobile. Further, since no member is required to be disposed below an automobile floor to exert increased rigidity to the rear panel, the resultant automobile would not be large and heavy.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS

Figure 1:
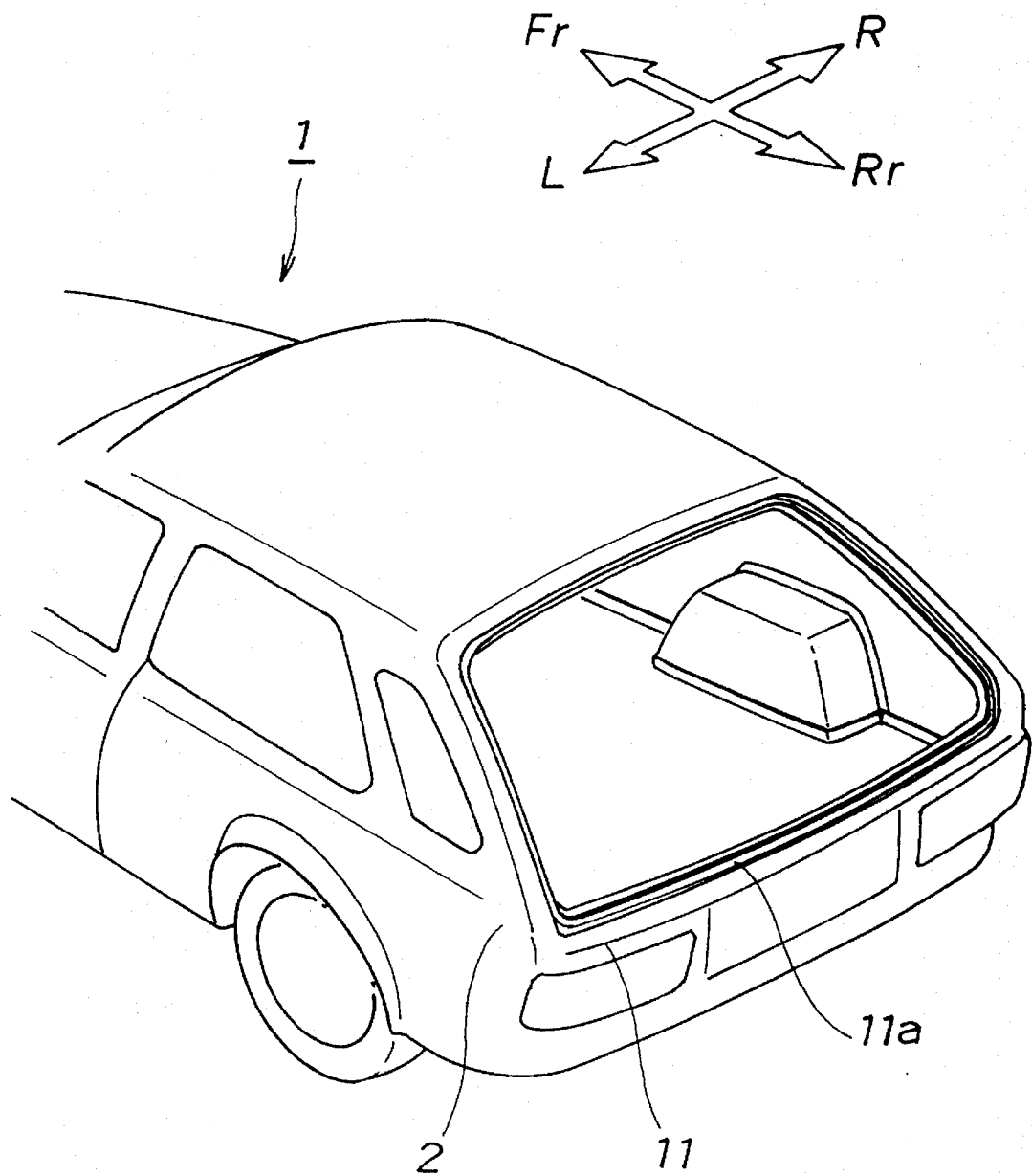
FIG. 1 is a perspective view of a hatch-back type automobile incorporating a rear body structure according to the present invention.

The terms "front", "rear", "left" and "right" used herein represent directions as seen from an automobile driver, and these directions are referenced by arrows Fr, Rr, L and R in the drawings figures.

A first embodiment of the present invention will now be described having reference initially to FIGS. 1–7.

As shown in FIG. 1, a hatch-back type automobile 1 employing the present invention includes in its rear portion a combined structure of a side panel 2 forming a side surface of the automobile and a rear panel 11 forming a rear surface of the automobile and having an opening 11a for receiving a back door not shown.

Figure 2:
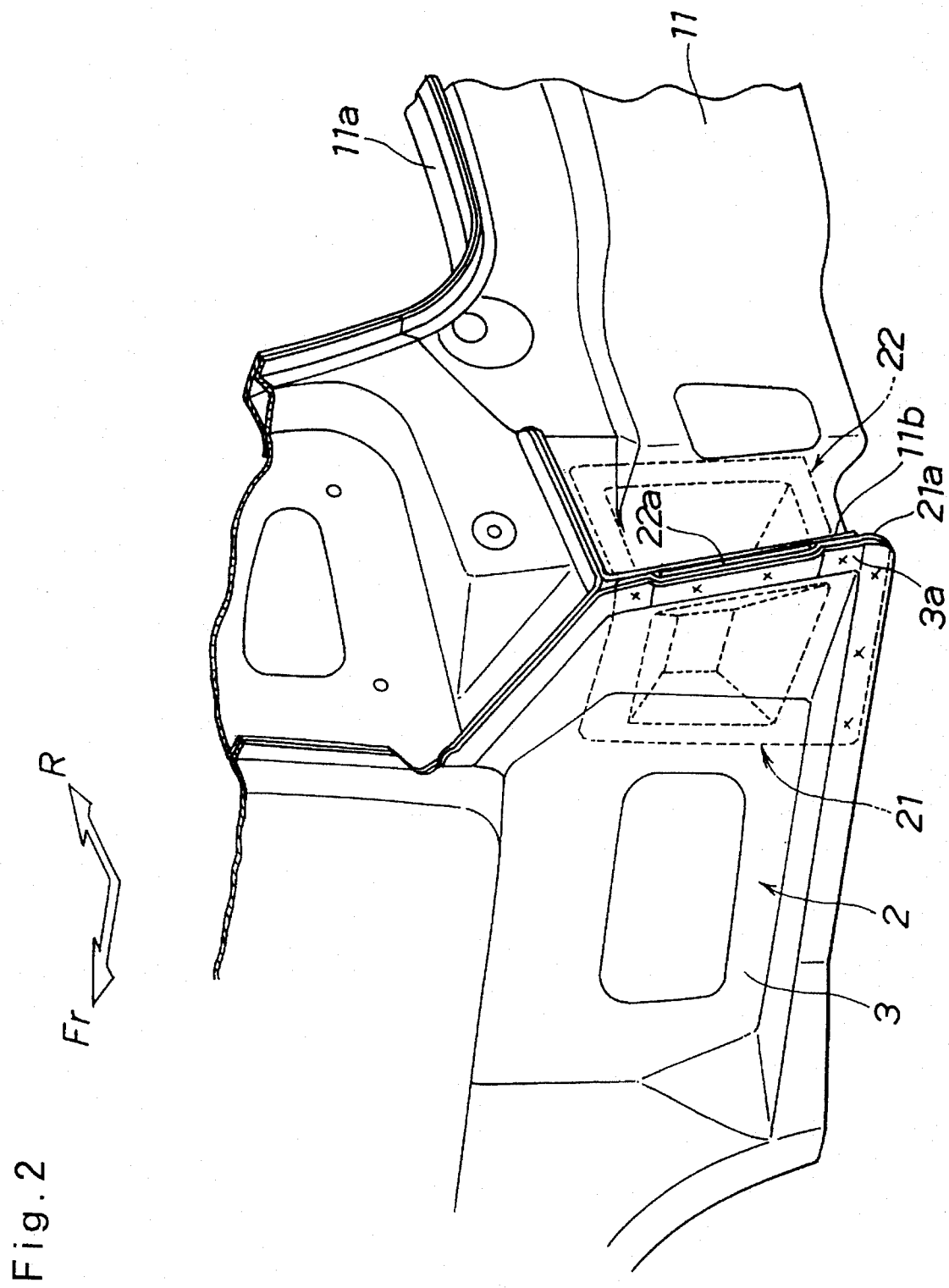
FIG. 2 is a perspective view illustrating a connection, as seen from outside of the automobile, between a side panel and a rear panel according to a first embodiment of the present invention.

FIG. 2 is a perspective view illustrating the connection, as seen from outside of the automobile, between the side panel 2 and rear panel 11, with an outermost ornamental panel removed. Although a more detailed explanation will be given below with reference to FIG. 4, a flange 3a of an outer side panel 3, a flange 11b of the rear panel 11, a flange 21a of an auxiliary reinforcing member 21, and a flange 22a of a corner member 22 are arranged in overlapped relations and weld connected together by, for example, spot welding.

Figure 3:
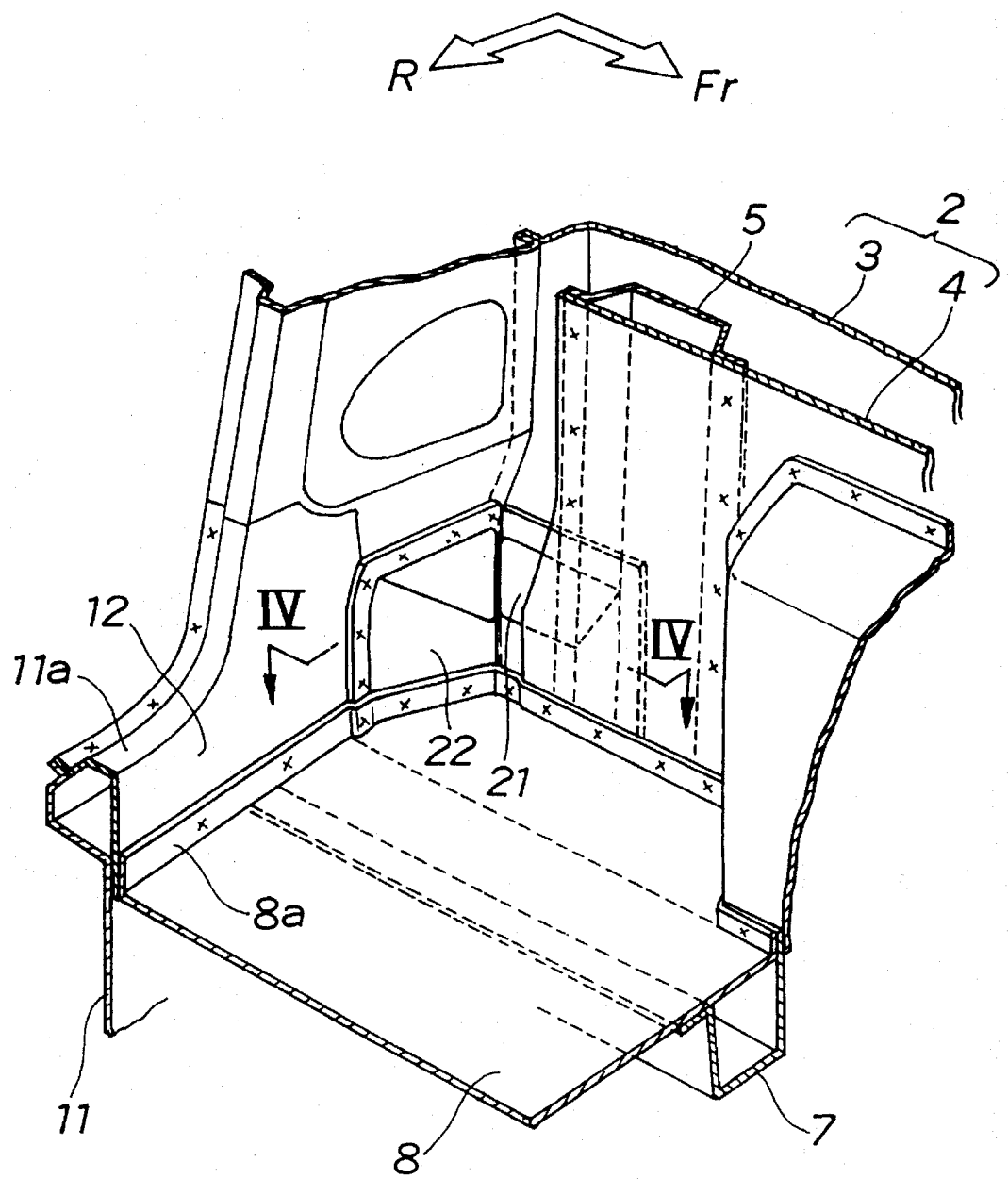
FIG. 3 is a perspective view illustrating the connection, as seen from inside of the automobile, according to the first embodiment of the invention.

FIG. 3 shows in perspective the connection between the side panel 3 and rear panel 11 as seen from inside of the automobile. As shown in the figure, the side panel 2 is comprised of an outer side panel 3 and an inner side panel 4. On an outer surface of a rear portion of the inner side panel 4, a reinforcing member 5 is disposed which extends vertically of the automobile. At a lower part of the reinforcing member 5, there is provided an auxiliary reinforcing member 21 which extends rearwardly between the outer and inner side panels 3, 4. The auxiliary reinforcing member 21 is connected at its rear portion to an inside end of the rear panel 11 by means of the corner member 22.

On an underside of the automobile, there is provided a rear frame 7 extending rearwardly of the automobile, on which frame a rear floor 8 is disposed. The rear floor 8 has an uprising edge 8a extending along a periphery thereof, to which the inner side panel 4, rear panel 11 (by means of a rear panel upper stiffener 12), auxiliary reinforcing member 21 and corner member 22 are connected.

Figure 4:
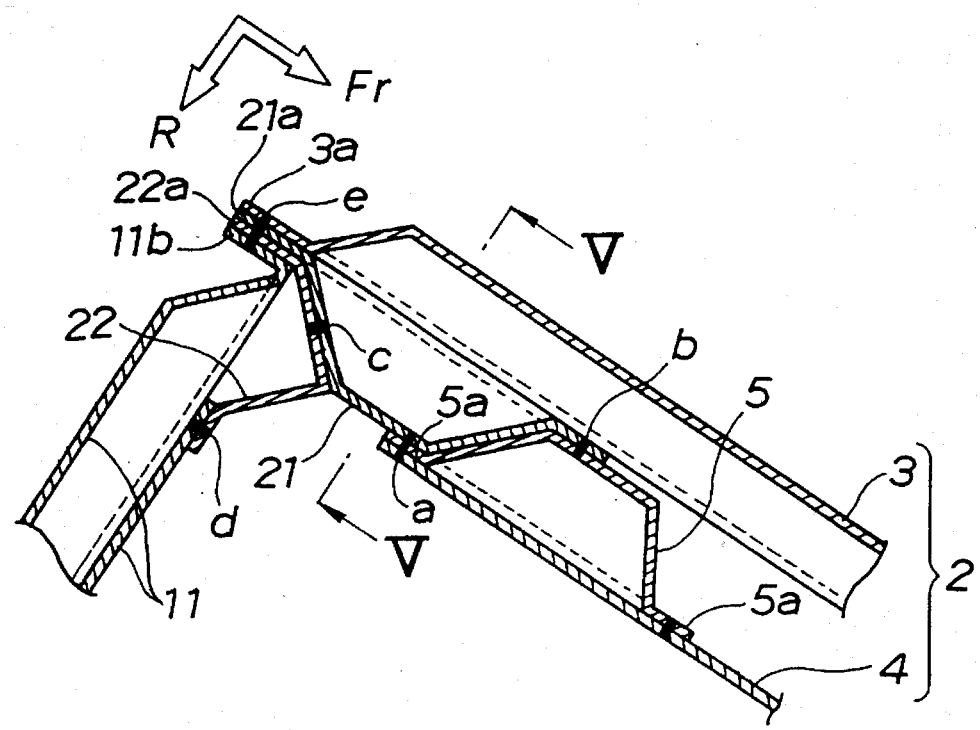
FIG. 4 is a cross-sectional view taken along line IV—IV of FIG. 3.

Reference is now made to FIG. 4 which is a cross-sectional view taken along line IV—IV of FIG. 3. The reinforcing member 5 has a substantially U-shaped cross section which divergently opens transversely inwardly of the automobile and has at its opened edge a flange 5a connected to the inner side panel 4 in such a manner as to form a closed section.

Auxiliary reinforcing member 21 has a substantially U-shaped cross section divergently opening transversely outwardly of the automobile and is connected to the reinforcing member 5 at points a and b. The auxiliary reinforcing member 21 thus constructed can easily be connected to the reinforcing member 5 and achieves increased rigidity with the latter.

Corner member 22 has a substantially L-shaped cross section divergently opening rearwardly of the automobile and is connected to the auxiliary reinforcing member 21 and rear panel 11 at respective points c and d.

The outer side panel 3, rear panel 11, auxiliary reinforcing member 21 and corner member 22 have respective flanges 3a, 11b, 21a and 22a, which are laid one over the other and connected together as at point e.

As is now apparent, additionally to the connection through their flanges 3a, 11b, 21a and 22a, the side panel 2 and rear panel 11 are connected through the corner member 22 and auxiliary reinforcing member 21 to the reinforcing member 5, thereby producing a connection of increased rigidity.

Figure 5:
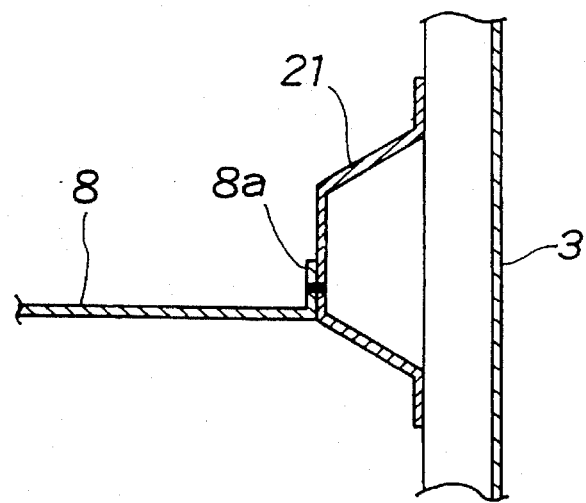
FIG. 5 is a cross-sectional view taken along line V—V of FIG. 4.

FIG. 5 is a cross-sectional view taken along line V—V of FIG. 4. The auxiliary reinforcing member 21 has a substantially U-shaped cross section which opens divergently and has an outer bottom surface to which the edge 8a of the rear floor 8 is attached.

Figure 6:
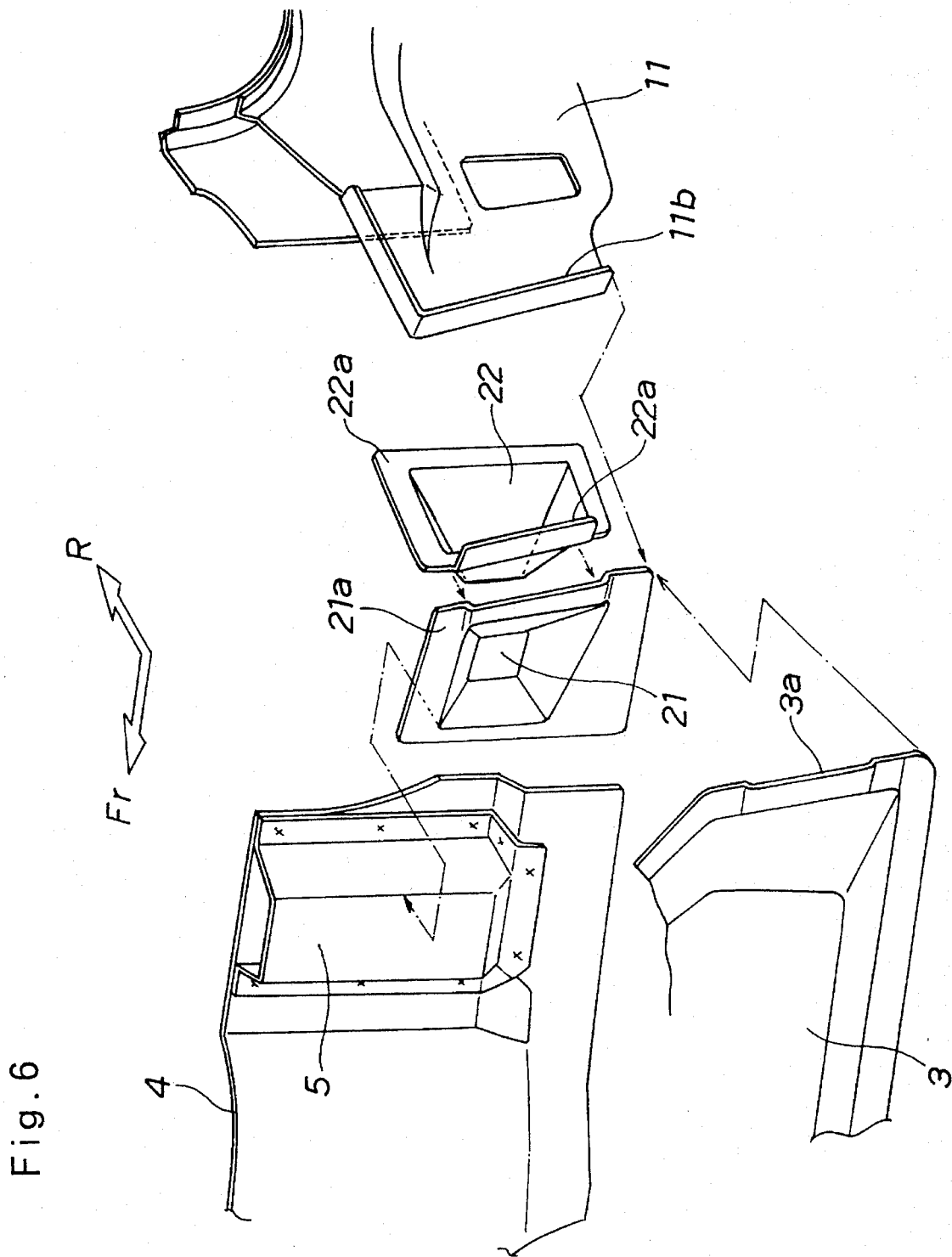
FIG. 6 is an exploded perspective view illustrating the connection, as seen from outside of the automobile, between the side panel and rear panel.

FIG. 6 is an exploded perspective view illustrating the connection between the side panel and rear panel, as seen from the outside of the automobile, according to the first embodiment of the present invention. The auxiliary reinforcing member 21 is disposed with its opened end oriented transversely of the automobile and has the flange 21a extending along the end. The corner member 22 is disposed with its opened end oriented rearwardly of the automobile and has the flange 22a extending along the end.

Figure 7:
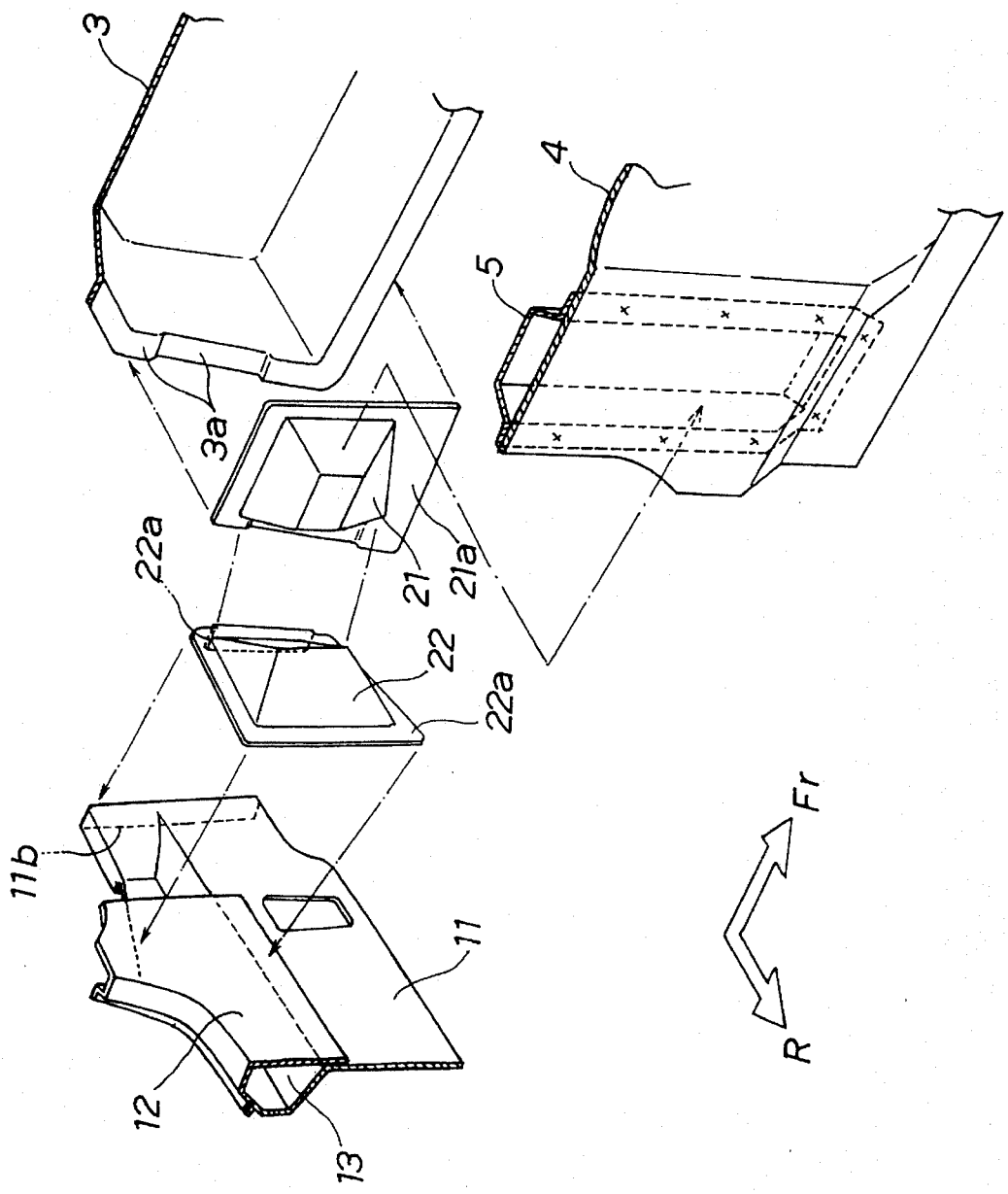
FIG. 7 is an exploded perspective view illustrating the connection, as seen from inside of the automobile, between the side panel and rear panel.

FIG. 7 is an exploded perspective view illustrating the connection between the side panel and rear panel, as seen from the inside of the automobile, according to the first embodiment of the present invention. On an upper part of the rear panel 11, there is disposed a rear panel upper stiffener 12 such that a reinforcing structure 13 of closed section is formed therebetween.

A mode of forming the connection between the side panel and rear panel will now be described with reference to FIGS. 4, 6 and 7.

Initially, the reinforcing member 5 is connected to the outer surface of the rear part of the inner side panel 4 to extend vertically of the automobile, as shown in FIG. 6. Thereafter, the auxiliary reinforcing member 21 is connected to the rear portion of the reinforcing member 5, whereafter the outer side panel 3 and inner side panel 4 are connected together in an overlapped relation.

Then, the rear panel upper stiffener 12 is attached to the upper part of the rear panel 11, as shown in FIG. 7. This is followed by attaching the corner member 22 to the inner end of the rear panel 11.

Thereafter, as shown in FIG. 4, the auxiliary reinforcing member 21 and corner member 22 are connected together as at c.

Lastly, the flange 3a of the outer side panel 3, the flange 11b of the rear panel 11, the flange 21a of the auxiliary reinforcing member 21 and the flange 22a of the corner member 22 are connected together at point e.

The above described mode of forming the connection structure was given by way of example only. It should readily be appreciated by those skilled in the art that other modes of constructing the inventive connection structure are also available.

A second embodiment of the invention will now be explained with reference to FIGS. 8, 9 and 10. In this instance the, same reference numerals are used to denote the same parts as in the first embodiment, omitting their explanations, and the same reference numerals with primes are used to denote similar parts as in the first embodiment.

Figure 8:
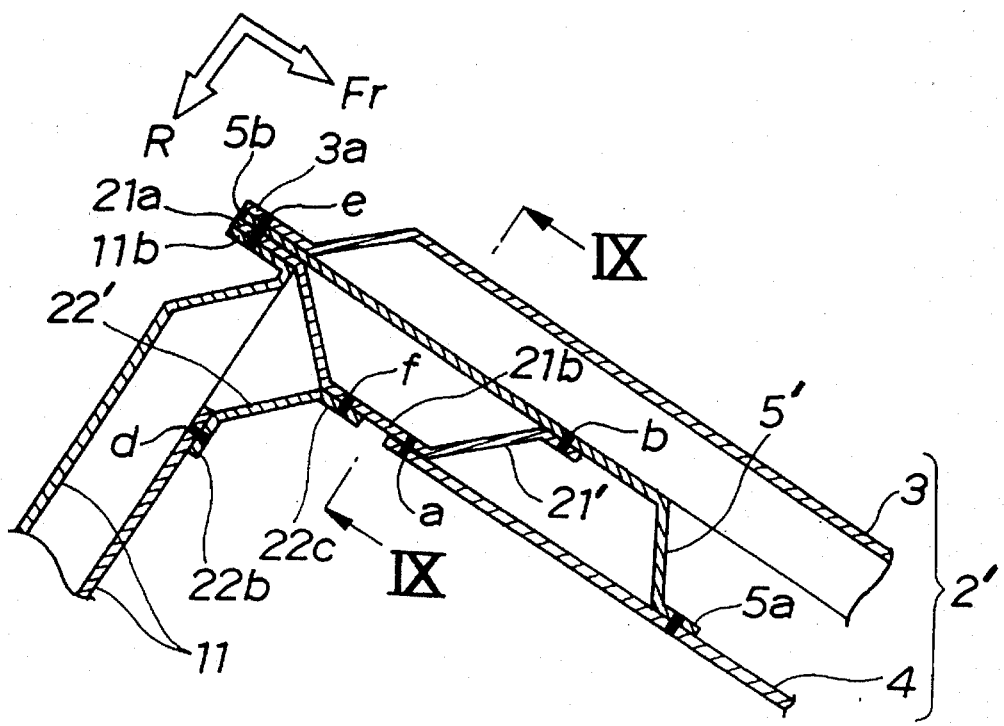
FIG. 8 is a sectional view taken horizontally of the connection between the side panel and rear panel.

FIG. 8 is a cross-sectional view illustrating the connection between the side panel and rear panel according to the second embodiment of the invention. The reinforcing member 5' has a substantially L-shaped cross section and a rear end 5b projecting rearwardly of the automobile.

Corner member 22' has a substantially flat cross section and flanges 22b, 22c at its opposite ends, which are slightly inclined inwardly of the automobile and connected to the inner end of the rear panel 11 and bottom portion 21b of the auxiliary reinforcing member 21' at points d and f, respectively.

The flange 3a of the outer side panel 3, rear end 5b of the reinforcing member 5', flange 11b of the rear panel 11 and flange 21a of the auxiliary reinforcing member 21' are laid one over the other and connected together at point e.

Figure 9:
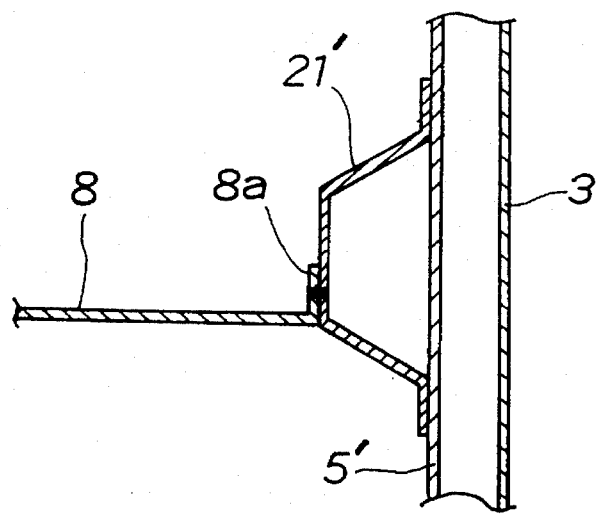
FIG. 9 is a cross-sectional view taken along line IX—IX of FIG. 8.

FIG. 9 is a cross-sectional view taken along line IX—IX of FIG. 8. The auxiliary reinforcing member 21' has a substantially U-shaped cross section opening divergently, to the outer surface of the bottom of which an edge 8a of the rear floor 8 is connected.

Figure 10:
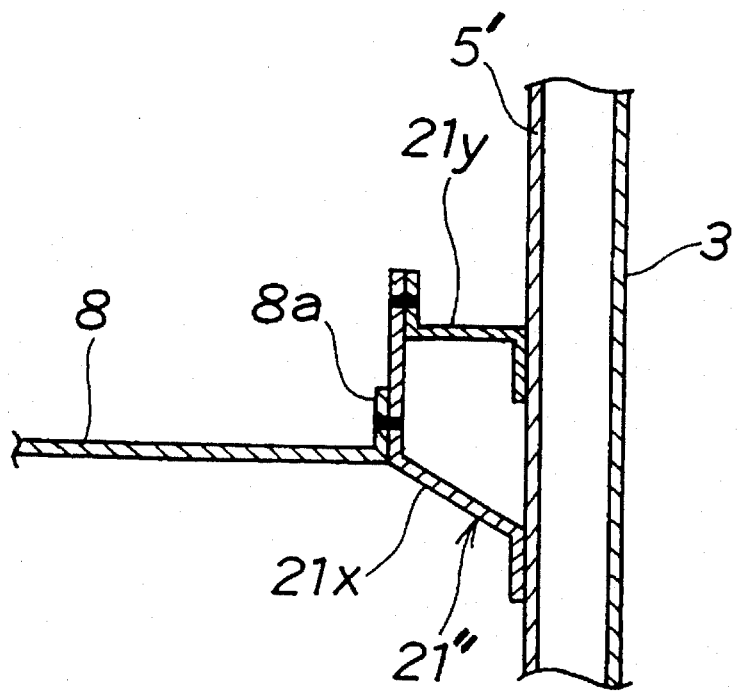
FIG. 10 is a Cross-sectional view similar to FIG. 9, illustrating an alteration of the embodiment of FIG. 8.

FIG. 10 is a cross-sectional view similar to FIG. 9 but illustrates an alteration of the embodiment shown in FIG. 8.

In this alteration, the auxiliary reinforcing member 21" has a double-doglegged portion 21y connected at one end to a body portion 21x by spot welding and the like.

In both the first and second embodiments, it is desired that the members are connected together by spot welding. However, other like methods of connection may also be employed.

As thus far explained in detail, an automobile rear body structure according to the present invention comprises a side panel composed of an inner and outer side panels, a rear panel connected to the side panel, a reinforcing member disposed vertically on an outer surface of a rear portion the inner side panel, an auxiliary reinforcing member disposed on the reinforcing member and extending between the outer and inner side panels rearwardly, and a corner member connecting a rear portion of the auxiliary reinforcing member to an inner end of the rear panel. With this arrangement, it is possible to provide increased rigidity to the connection between the side panel and rear panel and hence to the overall automobile body, because the inner end of the rear panel may be connected to the side panel by means of the corner member and auxiliary reinforcing member.

Further, since increased rigidity is achieved at the connection between the side panel and rear panel by providing the auxiliary reinforcing member between the outer and inner side panels, the rear portion of which is connected to the inner end of the rear panel by means of the corner member, no member needs to be disposed which projects into the inside of the automobile, whereby a large space is provided inside the automobile. Additionally, no member needs to be disposed on the underside of the automobile floor to provide increased rigidity to the rear panel, whereby a light weight and compact automobile is obtained.

What is claimed is:

1. A rear body structure of an automobile having an opening in a rear surface thereof, comprising: a side panel forming a side surface of a rear body of the automobile; a rear panel connected to said side panel and forming a rear surface of the automobile, said side panel comprising an outer side panel and an inner side panel disposed inwardly of said outer side panel; a reinforcing member disposed on an outer surface of a rear portion of said inner side panel and extending approximately vertically of the body; an auxiliary reinforcing member disposed on said reinforcing member and extending between said outer and inner side panels rearwardly of the body; and a corner member connecting a rear portion of said auxiliary reinforcing member to an inner end of said rear panel.

2. A rear body structure according to claim 1; wherein said reinforcing member has a substantially U-shaped cross section divergently opening transversely inwardly of the body, said auxiliary reinforcing member has a substantially U-shaped cross section divergently opening transversely outwardly of the body, and said corner member has a substantially L-shaped cross section opening rearwardly of the body.

3. A rear body structure according to claim 1; wherein said reinforcing member has an opened end terminating in an opened edge and a front flange extending along the opened edge and being connected to an outer surface of said inner side panel, said auxiliary reinforcing member has an opened end terminating in an opened edge and a front flange extending along the opened edge and being connected to an outer surface of said reinforcing member, said corner member has an opened end terminating in an opened edge and a transverse flange extending along the opened edge and being connected to an inner surface of said rear panel, and wherein said outer side panel, said rear panel, said auxiliary reinforcing member and said corner member each have a rear flange extending rearwardly of the body, the respective rear flanges being laid one over the other and connected together.

4. A rear body structure according to claim 1; further comprising a rear frame member disposed on a lower part of the body and extending longitudinally thereof; and a rear floor member disposed on said rear frame member, said rear floor member having a rising edge extending along a peripheral edge thereof, wherein said inner side panel, said auxiliary reinforcing member and said corner member are connected to said rising edge and said rear panel is connected through a stiffener disposed on an upper part thereof to said rising edge.

5. A rear body structure according to claim 1; wherein said reinforcing member has a substantially L-shaped cross section and said corner member has a substantially flat cross section.

6. A rear body structure according to claim 5; wherein the reinforcing member has a front flange connected to an outer surface of said inner side panel, said auxiliary reinforcing member has a front flange connected to an inner surface of an intermediate portion of a linear part of said reinforcing member and at a bottom portion thereof to the outer surface of said inner side panel, said corner member has a flange extending along an edge thereof, the flange being connected to an inner surface of said rear panel and an inner surface of a bottom portion of said auxiliary reinforcing member, and wherein said outer side panel, said rear panel, said reinforcing member and said auxiliary reinforcing member have respective rear flanges extending rearwardly of the body, which are laid one over the other and connected together.

7. A rear body structure according to claim 1; wherein the outer side panel is an exterior side panel of the automobile.

8. A rear body structure according to claim 1; wherein the reinforcing member has a channel structure and forms a closed cross section in combination with the inner side panel.

9. A rear body structure according to claim 1; wherein a portion of the reinforcing member has a U-shaped cross section having a base portion and a pair of sidewalls, the sidewalls are disposed in a divergently opening manner in an inward direction of the automobile body, and the reinforcing member forms a closed cross section in combination with the inner side panel.

10. A rear body structure according to claim 1; wherein the reinforcing member has a flange welded to the inner side panel.

11. A rear body structure according to claim 1; wherein the auxiliary reinforcing member has a channel structure and forms a closed cross section in combination with the reinforcing member.

12. A rear body structure according to claim 1; wherein a portion of the auxiliary reinforcing member has a U-shaped cross section having a base portion and a pair of sidewalls, the sidewalls are disposed in a divergently opening manner in an outward direction of the automobile body, and the auxiliary reinforcing member forms a closed cross section in combination with the reinforcing member.

13. A rear body structure according to claim 1; wherein a portion of the reinforcing member has a U-shaped cross section having a base portion and a pair of sidewalls disposed in a divergently opening manner, a portion of the auxiliary reinforcing member has a U-shaped cross section having a base portion and a pair of sidewalls disposed in a divergently opening manner, and a sidewall of the reinforcing member is disposed adjacent to a sidewall of the auxiliary reinforcing member.

14. A rear body structure according to claim 1; wherein the corner member has a channel structure and forms a closed cross section in combination with the rear panel.

15. A rear body structure according to claim 1; wherein a portion of each of the reinforcing member, the auxiliary reinforcing member and the corner member has a channel structure including a pair of angled sidewalls and are disposed such that an angled sidewall of the reinforcing member is adjacent to an oppositely angled first sidewall of the auxiliary reinforcing member and a second angled sidewall of the auxiliary reinforcing member is adjacent to an oppositely angled sidewall of the corner member.

16. A rear body structure according to claim 1; wherein the corner member has a substantially L-shaped cross section.

17. A rear body structure of an automobile, comprising: a side panel forming a side surface of the automobile; a rear panel connected to the side panel and forming a rear surface of the automobile; a first reinforcing member disposed on an inside surface of the side panel proximate a rear end thereof and extending in a substantially vertical direction; a second reinforcing member connected to a rear portion of the first reinforcing member and extending in a rearward direction of the automobile; and a corner member connecting a rear portion of the second reinforcing member to an inner end of the rear panel.

18. A rear body structure according to claim 17; wherein the side panel comprises an outer side panel and an inner side panel disposed inwardly of the outer side panel.

19. A rear body structure according to claim 18; wherein the outer side panel is an exterior side panel of the automobile.

20. A rear body structure according to claim 18; wherein the first reinforcing member is mounted to an outer surface of the inner side panel and is disposed between the outer and inner side panels.

21. A rear body structure according to claim 20; wherein the second reinforcing member is connected to an inside surface of the outer side panel.

22. A rear body structure according to claim 18; wherein a portion of the first reinforcing member has a substantially U-shaped cross section divergently opening transversely inwardly of the automobile body, a portion of the second reinforcing member has a substantially U-shaped cross section divergently opening transversely outwardly of the automobile body, and a portion of the corner member has a substantially L-shaped cross section opening rearwardly of the body.

23. A rear body structure according to claim 18; wherein the first reinforcing member has an opened end and a front flange extending around the periphery of the opened end, the front flange being connected to an outer surface of the inner side panel, the second reinforcing member has an opened end and a front flange extending around the periphery of the opened end, the front flange being connected to an outer surface of the first reinforcing member, the corner member has an opened end and a transverse flange extending along the periphery of the opened edge, the transverse flange being connected to an inner surface of the rear panel, and wherein the outer side panel, the rear panel, the second reinforcing member and the corner member each have a rear flange extending rearwardly of the body, the respective rear flanges being laid one over the other and connected together.

24. A rear body structure according to claim 18; further comprising a rear frame member disposed on a lower part of the body and extending longitudinally thereof; and a rear floor member disposed on the rear frame member, the rear floor member having a rising edge extending along a peripheral edge thereof; wherein the inner side panel, the second reinforcing member and the corner member are connected to the rising edge and the rear panel is connected through a stiffener disposed on an upper part thereof to the rising edge.

25. A rear body structure according to claim 18; wherein the first reinforcing member has a substantially L-shaped cross section and the corner member has a substantially flat cross section.

26. A rear body structure according to claim 25; wherein the first reinforcing member has a front flange connected to an outer surface of the inner side panel, the second reinforcing member has a front flange connected to an inner surface of an intermediate portion of a linear part of the first reinforcing member and at a bottom portion thereof to the outer surface of the inner side panel, the corner member has a flange extending along an edge thereof, the flange being connected to an inner surface of the rear panel and an inner surface of a bottom portion of the second reinforcing member, and wherein the outer side panel, the rear panel, the first reinforcing member and the second reinforcing member each have a rear flange extending rearwardly of the body, the respective rear flanges being disposed one over the other and connected together.

27. A rear body structure according to claim 18; wherein the first reinforcing member has a channel structure and forms a closed cross section in combination with the inner side panel.

28. A rear body structure according to claim 18; wherein a portion of the first reinforcing member has a U-shaped cross section having a base portion and a pair of sidewalls, the sidewalls are disposed in a divergently opening manner in an inward direction of the automobile body, and the first reinforcing member forms a closed cross section in combination with the inner side panel.

29. A rear body structure according to claim 18; wherein the first reinforcing member has a flange welded to the inner side panel.

30. A rear body structure according to claim 18; wherein the second reinforcing member has a channel structure and forms a closed cross section in combination with the first reinforcing member.

31. A rear body structure according to claim 18; wherein a portion of the second reinforcing member has a U-shaped cross section having a base portion and a pair of sidewalls, the sidewalls are disposed in a divergently opening manner in an outward direction of the automobile body, and the second reinforcing member forms a closed cross section in combination with the first reinforcing member.

32. A rear body structure according to claim 18; wherein a portion of the first reinforcing member has a U-shaped cross section having a base portion and a pair of sidewalls disposed in a divergently opening manner, a portion of the second reinforcing member has a U-shaped cross section having a base portion and a pair of sidewalls disposed in a divergently opening manner, and a sidewall of the first reinforcing member is disposed adjacent to a sidewall of the second reinforcing member.

33. A rear body structure according to claim 18; wherein the corner member has a channel structure and forms a closed cross section in combination with the rear panel.

34. A rear body structure according to claim 18; wherein a portion of each of the first reinforcing member, the second reinforcing member and the corner member has a channel structure including a pair of angled sidewalls and are disposed such that an angled sidewall of the first reinforcing member is adjacent to an oppositely angled first sidewall of the second reinforcing member and a second angled sidewall of the second reinforcing member is adjacent to an oppositely angled sidewall of the corner member.

35. A rear body structure according to claim 18; wherein the corner member has a substantially L-shaped cross section.

36. A rear body structure of an automobile having an opening in a rear surface thereof, comprising: a side panel forming a side surface of a rear body of the automobile, the side panel comprising an outer side panel and an inner side panel located inward of the outer side panel; a rear panel connected to the side panel and forming the rear surface of the automobile; a reinforcing member disposed on an outer surface of a rear portion of the inner side panel and extending vertically of the body; an auxiliary reinforcing member disposed on the reinforcing member and extending between the outer and inner side panels rearwardly of the body; a corner member connecting a rear portion of the auxiliary reinforcing member to an inner end of the rear panel; and a rear floor panel connected to the inner side panel, the rear panel, the auxiliary reinforcing member and the corner member.

* * * * *